T. MIDGLEY.
VEHICLE WHEEL.
APPLICATION FILED JULY 15, 1905.

913,219.

Patented Feb. 23, 1909

UNITED STATES PATENT OFFICE.

THOMAS MIDGLEY, OF HARTFORD, CONNECTICUT, ASSIGNOR TO THE HARTFORD RUBBER WORKS COMPANY, A CORPORATION OF CONNECTICUT.

VEHICLE-WHEEL.

No. 913,219.        Specification of Letters Patent.        Patented Feb. 23, 1909.

Application filed July 15, 1905. Serial No. 269,901.

*To all whom it may concern:*

Be it known that I, THOMAS MIDGLEY, a citizen of the United States, residing in the city of Hartford, county of Hartford, and State of Connecticut, have invented new and useful Improvements in Vehicle-Wheels, of which the following is a specification.

This invention relates to vehicle wheels, and more particularly to tires and rims for such wheels.

One important object of the invention is to provide a wheel rim with a removable side flange which may be easily removed to permit the application or removal of a resilient tire from the rim and which can be quickly and securely fastened in position so as to retain the tire upon the rim.

A special object of the invention is to provide a wheel rim having a removable side flange retained in position by means of an expansible locking ring, the rim and side flange being of such construction that they may be constructed at very low cost.

A further object of the invention is to provide a tire having an outer shoe or casing of special construction, and a wheel rim especially adapted for use with the tire, whereby the margins of the outer shoe or casing of the tire may be positively clamped upon the rim.

With the objects above mentioned in view, and others which will hereinafter appear, the invention comprises features of construction, combination and arrangement of parts hereinafter described, illustrated in typical forms in the accompanying drawings, and clearly set forth in the appended claims.

Figure 1:
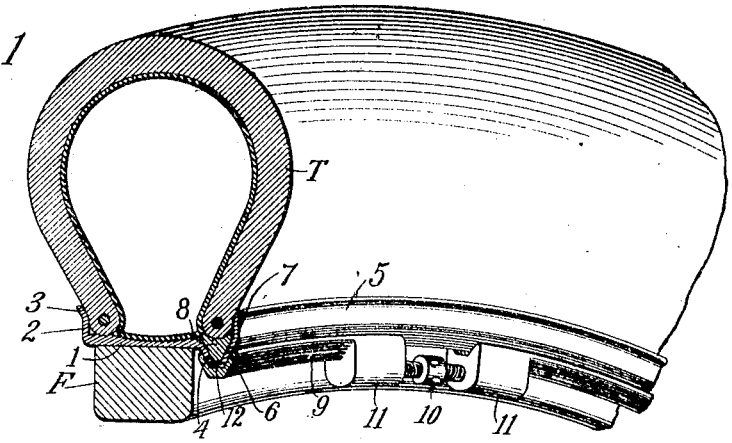
Figure 2:
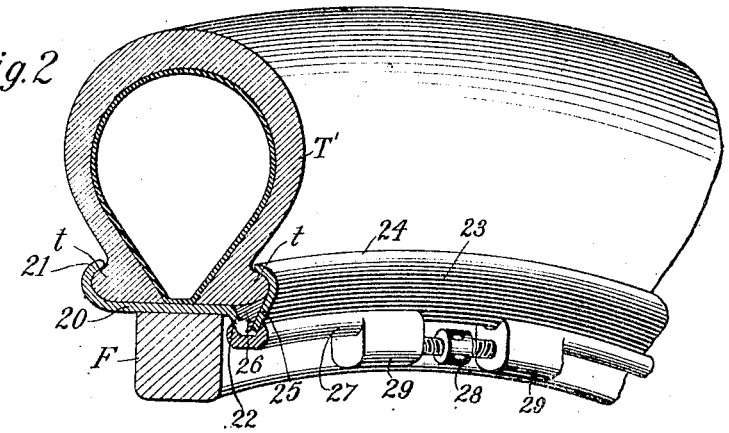

Referring to the drawings, in which corresponding parts are designated by similar characters of reference: Figure 1 is a perspective view of a section of the felly and rim of a wheel, showing a tire of the "Dunlop" type in position upon the rim. Fig. 2 is a perspective view of a section of wheel felly and rim with a tire of the "clencher" type secured in position upon the rim.

Referring to the drawings, F designates the wheel felly which is of ordinary construction and is the same in the several views. In Fig. 1, the main member 1 of the rim is a band or ring of tolerably thin metal provided at one margin with an outwardly extending flange 2 which has a laterally inclined lip 3. The other margin of the main rim member is characterized by an inwardly turned and inclined flange 4. As the member 1 is of the same thickness throughout, it may be easily formed from a flat strip of sheet metal by rolling.

The removable side flange 5 is an endless ring of metal comprising an inclined inner portion 6 corresponding to the flange 4 on the main rim member, but oppositely inclined, and an outer portion 7 corresponding to the flange 2 on the main rim member. Between the main rim member 1 and the removable side flange 5, I place a wedge-shaped filling member 8, which is preferably a split ring and has its sides inclined to correspond to the inclinations of the flange 4 upon the main rim member and the inclined inner portion 6 of the removable side flange 5. The outer surface of the filling member 8 is preferably formed with a shallow groove to correspond to the rounded margin of the outer casing T of the tire.

To retain the side flange and filling member in proper position in relation to the main rim member, I make use of an expansible ring 9 which is provided with a turnbuckle 10 or other equivalent device for positively expanding and contracting the ring. This turnbuckle 10 is preferably disposed between heavy lugs 11 at the ends of the ring, and the ring is characterized by a channel 12 on its outer surface with outwardly diverging sides which correspond to the exposed faces of the flange 4 on the main rim member and the inner portion 6 of the removable side flange.

As will be seen, the side flange of the rim above described may be easily secured in position to retain the tire or released to permit the removal of the tire. In the operation of securing the side flange in position after the tire has been applied to the main rim member, the filling piece 8 is first fitted against the outer face of the flange 4 and then the side flange 5 is placed in position against the filling piece. The retaining ring 9 is then introduced into such position that when expanded by means of the turnbuckle 10 the diverging sides of the channel 12 will engage the exposed faces of the flange 4 on the main rim member and the inner portion of the removable side flange. The wedging action of the retaining ring 9 will force the removable side flange toward the flange 4 of the main rim member and at the same time expand the filling piece 8 to the extent permitted by the inextensible base of the outer casing T of the tire, thus securing the removable side flange, the filling piece and the main rim member in firm association.

The release of the removable side flange to permit the removal of the tire from the rim is just the reverse of the operation just described. The retaining ring 9 is first contracted by means of the turnbuckle 10 until the retaining ring may be moved out of engagement with the flange 4 of the main rim member and the removable side flange. This leaves the removable side flange and filling piece free so that they will drop out of position if not held in place. After the side flange is removed the tire can be slipped off the rim without difficulty, as will be evident.

The rim construction shown in Fig. 2 is similar in the main to that shown in Fig. 1, the only differences being such as are necessary to adapt the rim for use with a clencher tire. In this figure, the casing T' is of the usual clencher tire, being provided with marginal beads t for engagement with overhanging portions of the rim. The main rim member 20 presents at one edge an overhanging marginal portion 21 for engagement with one of the beads on the outer shoe or casing of the tire, and at the other edge there is an inwardly turned and laterally inclined flange 22. The removable side flange 23 presents a curled overhanging portion 24 for engagement with the adjacent bead on the casing of the tire, and an inner inclined portion 25 corresponding to the flange 22 but inclined in the opposite direction. Between the flange 22 on the main rim member and the inner portion 25 of the removable side flange, a wedge-shaped filling member 26 is provided. This filling member has its outer surface formed to correspond to the contacting surface of the adjacent bead on the outer casing of the tire and is preferably a split ring of suitable diameter. The side flange and filling piece shown in Fig. 2 are retained in position by means of a channeled retaining ring 27, similar in the main to the retaining ring 9 above described. A turnbuckle 28 is arranged between the end lugs 29 on the channeled retaining ring, and the channel in the ring corresponds to the inclinations of the exposed faces of the flange 22 and the inner portion 25 of the removable side flange.

The application and removal of the side flange shown in Fig. 2 are effected in precisely the same manner as the application and removal of the side flange shown in Fig. 1, so specific description thereof is deemed unnecessary.

While I have illustrated two typical forms only of my invention, it is to be understood that other forms for use with tires of different types may be readily produced without departing from the spirit of the invention or exceeding its scope and I do not, therefore, limit myself to the forms shown and above described.

Having thus described my invention, what I claim as new and desire to secure by Letters Patent is:

1. In a vehicle wheel, the combination with a tire, of a main rim member and a side flange adapted to retain the tire in position, said main rim member and said side flange presenting oppositely inclined inner marginal portions, of a filling piece separate from the tire and disposed between said inclined inner marginal portions of the main rim member and the side flange, and means for clamping the main rim member, the side flange, and the filling piece in association.

2. In a vehicle wheel, the combination with a tire, of a main rim member and a removable side flange adapted to retain the tire in position, said main rim member and removable side flange presenting oppositely inclined portions of the same thickness throughout, of a filling piece separate from the tire and disposed between said inclined portions, and means for clamping the main rim member, the filling piece, and the removable side flange in association.

3. In a vehicle wheel, the combination with a tire, of a main rim member and a removable side flange adapted to retain the tire in position, said main rim member and said removable side flange being formed of sheet metal presenting oppositely inclined marginal portions of the same thickness throughout, of a filling piece separate from the tire and disposed between said oppositely inclined portions, and means for clamping the main rim member, the filling piece, and the removable side flange in association.

4. In a vehicle wheel, the combination with a tire, of a main rim member and a removable side flange adapted to retain the tire in position, said main rim member and removable side flange being formed of rolled sheet metal and presenting oppositely inclined inner marginal portions, of a filling piece separate from the tire and disposed between said inner marginal portions, and means for clamping the main rim member, the removable side flange, and the filling piece in association.

5. In a vehicle wheel, the combination with a main rim member and a removable side flange, said main rim member and removable side flange presenting oppositely inclined inner marginal portions, of a filling piece disposed between said inner marginal portions, and a channeled locking ring engaging said inner marginal portions and clamping the main rim member, the removable side flange, and the filling piece in association.

6. In a vehicle wheel, the combination with a main rim member presenting a lateral channel and an inwardly and laterally inclined flange, of a removable side flange having its inner marginal portion inclined oppositely to the flange on said main rim member, a filling structure between said flanges and means engaging the flange on the main rim member and the inner inclined portion of the removable side flange to clamp them in association with said filling structure.

7. In a vehicle wheel, the combination with a main rim member presenting a lateral channel and an inwardly and laterally inclined flange, of a removable side flange having its inner marginal portion inclined oppositely to the flange on the main rim member, a filling structure between said flanges and a channeled locking ring adapted to engage the inclined flange on the main rim member and the inclined marginal portion of the removable side flange to force the removable side flange and main rim member into clamping engagement with said filling structure.

In testimony whereof, I have signed my name in the presence of two witnesses.

THOMAS MIDGLEY.

Witnesses:
 D. W. PINNEY,
 SAML. T. WHELAN.